United States Patent [19]

Benton

[11] 4,305,059

[45] Dec. 8, 1981

[54] MODULAR FUNDS TRANSFER SYSTEM

[76] Inventor: William M. Benton, Rte. 1, Box 191, Middleburg, Va. 22117

[21] Appl. No.: 109,332

[22] Filed: Jan. 3, 1980

[51] Int. Cl.³ .............................................. G06F 3/00
[52] U.S. Cl. .................................. 340/825.33; 235/379
[58] Field of Search ...................... 340/149 A, 152 R; 235/441, 492, 379; 364/406, 408

[56] References Cited

U.S. PATENT DOCUMENTS

| | | | |
|---|---|---|---|
| 3,559,175 | 1/1971 | Pomeroy | 340/152 |
| 3,749,887 | 7/1973 | Giuliani | 235/441 |
| 3,932,730 | 1/1976 | Ambrosio | 235/ |
| 3,934,122 | 1/1976 | Riccitelli | 340/149 A |
| 3,937,925 | 2/1976 | Boothroyd | 340/152 R |
| 3,984,660 | 10/1976 | Oka | 235/ |
| 4,001,550 | 1/1977 | Schatz | 235/379 |
| 4,007,355 | 2/1977 | Moreno | 340/149 A |

OTHER PUBLICATIONS

P. E. Stuckert et al., "Personal Portable Terminal for Credit Transactions", IBM Tech. Disclosure Bulletin, vol. 20, No. 11B, Apr. 1978, pp. 5073-5076.

*Primary Examiner*—Donald J. Yusko
*Attorney, Agent, or Firm*—Lowe, King, Price & Becker

[57] ABSTRACT

A system for transferring funds in lieu of cash comprises an identical funds transfer module issued by a bank or other financial institution and carried by each member who may be a customer or vendor. The modules, which are adapted to exchange funds data bidirectionally, each comprise a memory for storing an account balance, a keyboard for manually entering the amount of a transaction and an external connector for interconnecting pairs of modules for funds data transfer. The account balance stored in each module as well as the transaction amount is displayed prior to completion of each transaction. Upon approval of the transaction, the account balance stored in the memory of the customer module is debited and funds data are transferred to credit the account balance stored in the memory of the vender module. Since the modules are identical to each other, the vendor module may subsequently be used to either receive additional funds data in a vendor mode or be used to output funds data in a customer mode. Ultimately, the stored account balance may be deposited with the bank. An internal timer may be provided to periodically debit the stored account as a service charge for membership in the system.

17 Claims, 8 Drawing Figures

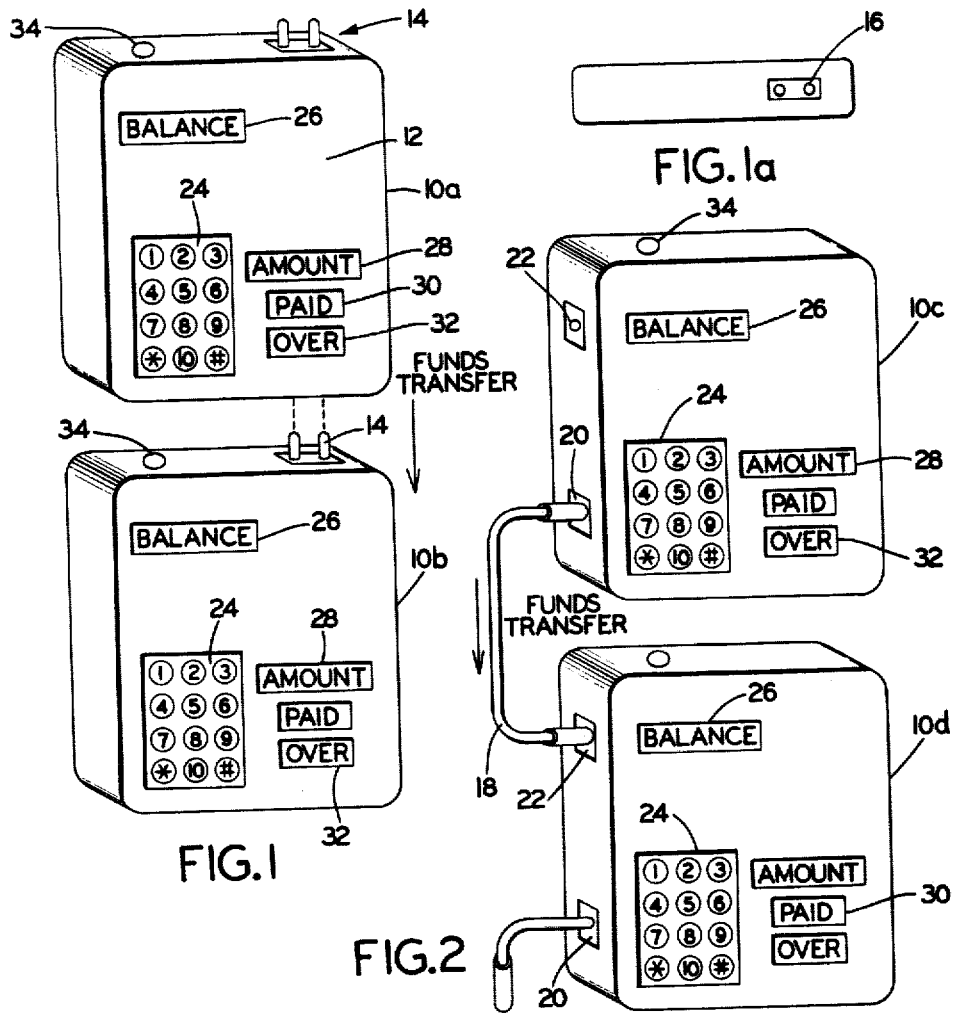
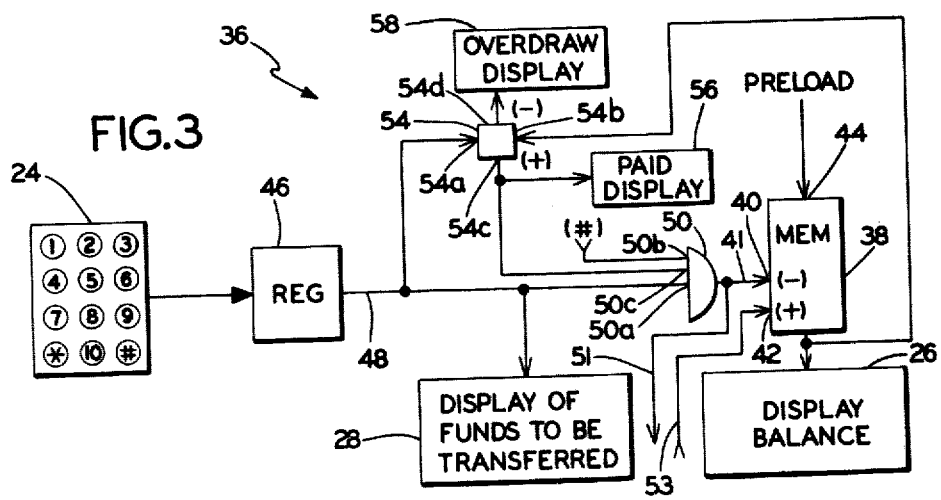

MODULAR FUNDS TRANSFER SYSTEM

TECHNICAL FIELD

The present invention relates generally to electronic off-line data transfer and more particularly toward a funds transfer system comprising a plurality of identical hand-held funds data storage and transfer modules for performing cashless transactions without any intervening local or centralized computer.

BACKGROUND ART

Several prior art systems of which I am aware have been provided for enabling financial transactions to be made in lieu of cash. In Moreno U.S. Pat. No. 4,007,355, for example, cashless transactions are made between credit cards through a special interface apparatus located at the vendor station. The cards themselves contain fund data storage capability but data input and control are provided by the interface. No exchange of funds can be made arbitrarily; because the cards have no keyboards, there must be an interface apparatus present or the cards are useless.

Haker U.S. Pat. No. 4,032,931 discloses a keyboard assembly for transferring financial data between vendors and customers. There are no cards involved and funds data transfer is made during each transaction between the point of sale and a central computer.

Riccitelli U.S. Pat. No. 3,934,122, Schatz U.S. Pat. No. 4,001,550 and Dethloff U.S. Pat. No. 4,105,156 are examples of prior art wherein credit cards containing memory devices in which an account balance and other information are stored to be accessed during funds transfer transactions. As in the Haker patent, supra, the card in each system is used in combination with an interface device located with the vendor; it is impossible to transfer funds data directly between cards without any intervening apparatus.

DISCLOSURE OF INVENTION

It is an object of the present invention, therefore, to provide a system wherein funds transfer is carried out directly between cards or modules without any intervening apparatus or interface or any central computer, to simulate a cash transaction. Another object is to provide cashless transaction modules wherein funds transfer is carried out bidirectionally between modules to enable interchangeability between customer and vendor modes of operation.

In accordance with the invention, each module comprises a housing having an internal memory for storing an account balance and a keyboard for manually entering the amount of a transaction. The module is electrically connected by an external connector to another module with which a funds transfer is to be carried out. In accordance with one embodiment, the housing of each module contains two prong plug and socket connectors enabling the module to be mated together for transfer of funds data. In another embodiment, data coupling between modules for funds is provided by an external cable interconnected between electrical receptacles in the modules.

With the two modules interconnected with each other to transfer funds data from the first (customer) module to the second (vendor) module, the transaction amount, keyboard entered at the customer module, is temporarily stored in a shift register. Following authorization of the transaction, the transaction data are transferred to the memory of the customer module as a debit to reduce the stored balance of the amount of the transaction. The transaction data are also supplied via the interconnection cable or plug to the vendor module to credit by the transaction amount the balance stored in the memory of the vendor module. Displays on each module indicate the account balance and amount of transaction as well as signal completion of a transaction.

Prior to completion of each transaction, the amount of the transaction is compared to the balance stored in the memory of the customer module. If the amount of the transaction exceeds the account balance, the transaction is inhibited and an overdraft display on the customer module is energized.

An internal timer periodically debits the account balance stored in memory as a service charge for membership in the funds transfer system. In one variation, the periodic debiting of the account balance is inhibited if transactions are completed at a predetermined frequency corresponding to a minimum acceptable usage.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 1 is a perspective view of two funds transaction modules in accordance with one embodiment of the invention;

FIG. 1a is a bottom view of one of the modules showing the female plug for interconnecting pairs of modules;

FIG. 2 is a perspective view of a pair of funds transaction modules in accordance with a second embodiment of the invention;

FIG. 3 is a block diagram showing one embodiment of circuitry for performing funds data transfer between modules;

BEST MODE FOR CARRYING OUT THE INVENTION

Figure 4:
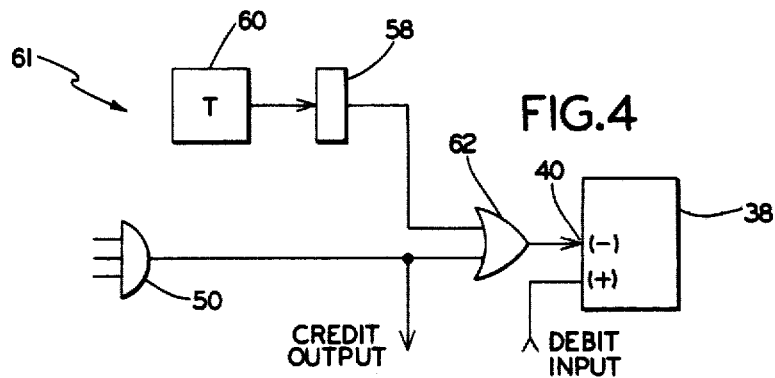
FIG. 4 is a block diagram showing a timer and associated circuit for periodically debiting the account balance stored in memory.

In accordance with the invention, a system for transferring funds data in lieu of cash among system members or subscribers involves an electronic funds transfer module that is carried by each member and adapted to exchange funds data with other modules without any intervening interface apparatus or host computer. Referring to FIG. 1, each module 10 comprises a housing 12 upon which are located male plug member 14 and female plug members 16 (see FIG. 1a) adapted to mate together for electrically transferring funds data between module pairs. In FIG. 1, the female plug member 16 of module 10 is to be connected with the male plug member 14 of module 10a to effect funds transfer from module 10a to module 10b. In FIG. 2, each module 10c, 10d contains a pair of female sockets 20, 22; modules 10c and 10d are electrically coupled to each other for funds transfer by a cable 18 extending between the two sockets 20, 22.

A keyboard 24 is mounted on the surface of each housing 12 for manually entering a transaction amount. Also mounted on each housing 12 is a first display 26 for displaying an account balance maintained by the module and a second display 28 displaying the amount of the transaction manually entered at keyboard 24. In addition, a third display 30 indicates that a transaction has been approved and completed between the two modules and a fourth display 32 indicates that no transaction has been completed because the transaction amount entered at keyboard 24 is greater than the account balance stored in the module. An external socket 34 on each housing 12 receives funds data from the sponsoring institution, such as a bank, to supplement an existing account or to open a new account.

It should be appreciated that modules 10a-10d can be used to perform any type of financial transaction without using any cash. Because the modules are identical, there is no physical distinction between customer and vendor modules; each module can be used in either mode like cash. Any final balance stored in the module can ultimately be returned to the bank if not transferred to another module.

Referring now to FIG. 3, a circuit 36 contained within each module 10a-10d for storing an account balance and controlling financial transactions includes a first memory 38 for storing an account balance. The memory, which is conventional, has a first input 40 for debiting or reducing the stored account balance and a second input 42 for crediting or increasing the balance. The memory 38 has sufficient storage capacity to store at least six digits representing a maximum balance of at least $9,999.99. In practice, during a transaction the memory 38 is debited in a customer mode and credited in a vendor mode. An initial account balance stored in memory 38 is applied to memory input 44 through socket 34 (see FIGS. 1 and 2). The content of the memory 38 is displayed at a display unit 26 which is mounted in a prominent place on housing 12 as shown in FIG. 1 and 2.

Keyboard 24 is a conventional push button keyboard having digits 1-10 as well as a pair of functions, * and # which are used for control. The output of keyboard 24, which is in the form of a binary coded representation of the digit or function key depressed, is stored in a second memory device or register 46. The register 46, which is conventional, also has sufficient storage capacity to accommodate at least six digits. The content of register 46, which is the amount of a requested transaction, is displayed in unit 28 on the face of module housing 12, as shown in FIGS. 1 and 2.

Following approval of a transaction, i.e, that the user is authorized and that the account balance is sufficient to accommodate the transaction, the contents of register 46 are supplied to memory 38 to debit the customer's account balance by the amount of the transaction and to the memory 38 of the vendor module through plugs 14, 16 (FIGS. 1 and 1a) or cable 18 (FIG. 2) to credit the vendor account. Output 48 of register 46 is connected to debit input 40 of memory 38 and to plug 16 (FIG. 1a) or socket 20 (FIG. 2) for coupling to another module 10 through one input 50a of AND gate 50. AND gate 50 passes the output signal of transaction register 46 in bit serial to the debit input 40 of memory 38 and credit input of the corresponding memory of another module when a charge transaction is requested only if there is an adequate account balance to support the transaction. A charge signal, generated from the keyboard at one of the function keys, e.g., # of keyboard 24 is supplied to a second input 50b of AND gate 50. Applied to the third input 50c of AND gate 50 is a signal generated by an overdraw detector 54 which generates a logic one signal to enable gate 50 only if the transaction amount stored in register 46 is less than the balance stored in memory 38.

Detector 54 is a digital comparator having one input 54a connected to the output 48 of register 46 and a second input 54b connected to the output of memory 38. If the difference between the contents of memory 38 and the contents of register 46 is positive indicating that the account balance is larger than the transaction amount, a logic one signal is generated at detector output 54c energizing paid display 56 and enabling gate 50 to pass the signal stored in register 46 to debit input 40 of memory 38 and to the credit input 42 of the corresponding memory of the mating module. If, on the other hand, the difference is negative, indicating an overdraw, a logic one signal is generated on detector output 54d energizing overdraw display 58; a logic zero signal on output 54c maintains gate 50 disabled. The requested transaction is thus prevented from being debited or credited with respect to the memories 38 of the two modules undergoing funds data transfer.

Assuming a customer mode of operation, digits manually entered at keyboard 24 of module 10a are stored in register 46. When a transaction is requsted by depression of the (#) digit on keyboard 24, a logic one signal is applied to the charge input 50b of gate 50. Detector 54 determines whether there are sufficient funds in memory 38 to support the requested transaction stored in register 46. If there are sufficient funds, a logic one signal is generated at output 54c to input 50c of gate 50 enabling the gate to supply the output of register 48 in bit serial format on line 49 to debit input 40 of memory 38 and on line 51 to credit input 42 of the corresponding memory in another module 10b. Thus, the transaction is debited against the customer's account within the module 10a and credited to the vendor's account in module 10b. When the same module 10a is used in a vendor mode, memory 38 is credited along line 53 at input 42 with the transaction amount by transfer of funds data into plug 14 or socket 22.

In order to provide the capability of periodically debiting the account balance stored in transaction module 10 as a membership service charge, a debiting circuit 61 shown in FIG. 4 comprises a register 58 having stored therein digital data indicative of a membership fee that is periodically controlled by timer 60 to be outputted to the debit input 40 of memory 38. The output of register 58 is applied to memory 30 through one input of an OR gate 62; the remaining input of OR gate 62 is connected to the output of AND gate 50. Thus, the account balance stored in memory 38 is debited during each transaction by register 46 through gates 50 and 62 and is also debited periodically, e.g., monthly, as a service charge by register 58 through OR gate 62.

Figure 5:
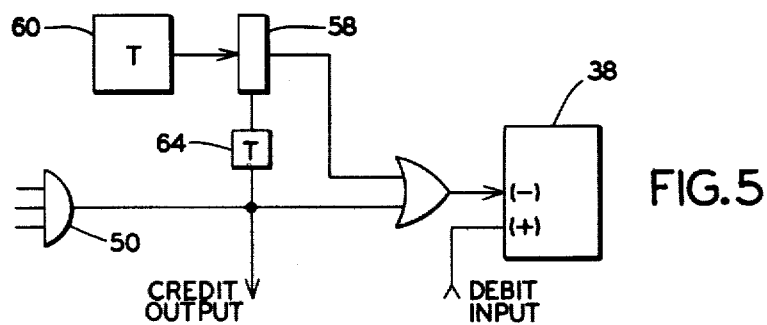
FIG. 5 is a variation of FIG. 4 wherein the periodic debiting of the stored account balance is inhibited as a function of frequency of funds transfer activity.

It may be desirable to forego a membership charge in the system if there is at least a predetermined minimum amount of usage of the system by the user. Thus, in accordance with FIG. 5, the circuit of FIG. 4 is modified by including a second timer 64 connected between the output of gate 50 and an inhibit input of register 58. The time duration of timer 64 corresponds to the period of minimum acceptable usage of the system, e.g., one week. Thus, each time a transaction is completed as indicated by the bit serial signal passing through gate 50 to memory 38, timer 64 is enabled to maintain register 58 inhibited for the one week time duration. During this time, membership fee charge control signals generated by timer 60 do not enable the register 58 to debit the account balance stored in memory 38.

Figure 6:
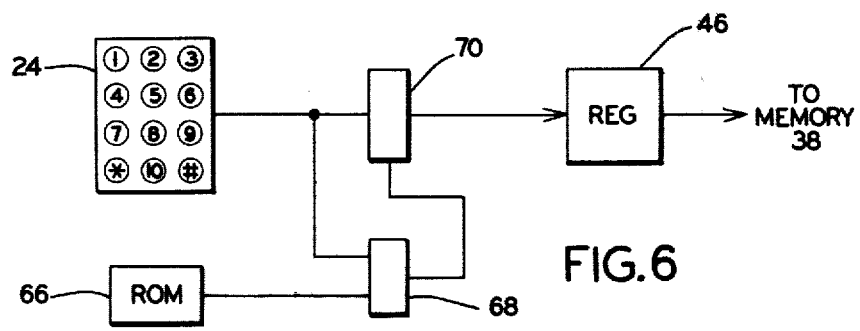
FIG. 6 is a block diagram showing a circuit for enabling a funds transfer transaction only if keyboard entered data positively compare with secret number data stored in a read only memory.
Figure 7:
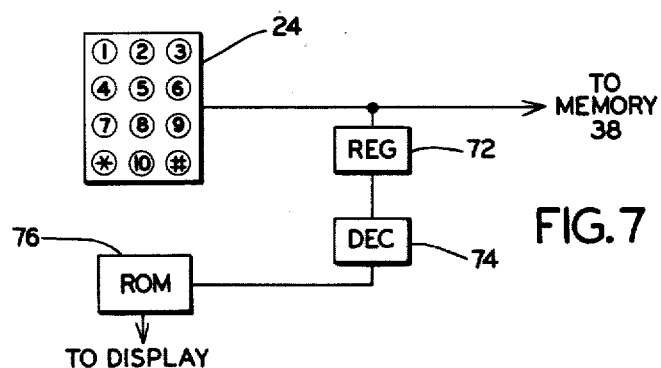
FIG. 7 is a block diagram showing a circuit for determining authenticity of a user by generating a secret number associated with the customer module for display at the vendor module.

Referring now to FIGS. 6 and 7, two systems for verifying that the user of module 10 is an authorized user prior to enabling completion of a transaction are described. In FIG. 6, before a transaction manually entered at keyboard 24 is transferred to storage register 46, the transaction data are temporarily stored in an intermediate register 70. A secret number or personal identification number (PIN) is keyboard entered by the user for comparison with a corresponding number stored in read only memory (ROM) 66. The keyboard entered number and stored number are compared in a comparator 68. If there is a positive comparison between the keyboard entered number and the stored number, the comparator 68 generates an approval signal that enables the intermediate register 70 to transfer keyboard entered transaction data to the storage register 46. If desired, the verification in comparator 68 could be made prior to entry of the transaction amount into register 70 by causing the output of the comparator to enable register 70 to pass keyboard entered data directly through to storage register 46.

In FIG. 7, verification of authenticity of the customer is made by transferring to the vendor module a secret number stored in ROM 76 within the customer module. The ROM 76 is addressed by keyboard entered data stored in register 72 and decoded in decoder 74. Only after the vendor has verified on a display (not shown) on the vendor module directly coupled to the output of ROM 76 or by data comparison circuitry (not shown) in the vendor module that the module is an authorized one assigned to his business will the vendor authorize the customer to complete a purchase transaction. In some systems, it is not necessary that the user remember a secret number; it may be required only that the module 10 being used in the customer mode be verified as authorized to make a transaction with a vendor and that the membership status of the module is current. In that case, the ROM 76 may be provided with a fixed address. The number generated by ROM 76 is displayed at the vendor module for verification using a check list.

In this disclosure, there is shown and described only the preferred embodiments of the invention, but, as aforementioned, it is to be understood that the invention is capable of use in various other combinations and environments and is capable of changes or modifications within the scope of the inventive concept as expressed herein. For example, with reference to FIG. 1, male and female connectors 14 and 16 could be spaced apart or keyed so as to mate with only modules operative within the same national currency. Similarly, with respect to FIG. 2, the cable 18 could be designed to interconnect only modules 10 programmed to transfer funds having the same national currency basis.

I claim:

1. A module for performing funds data transfer in lieu of cash transactions, comprising a housing; first memory means for storing an account balance; keyboard means on said housing for manually entering transaction data; second memory means for storing said keyboard entered data; coupling means for bidirectionally transferring transaction data between said module and a second module with which funds data are to be transferred; first means for debiting the balance stored in said first memory means by the transaction data stored in said second memory means; second means for crediting said stored balance by transaction data incoming to said module through said coupling means; and means for enabling a funds data transfer between modules.

2. A system for performing funds data transfer in lieu of cash transactions, comprising a plurality of identical funds data transfer modules adapted to be interconnected in pairs with each other during transactions, each of said modules including a housing; keyboard means on said housing for manually entering transaction data; first memory means for storing an account balance; second memory means for storing keyboard entered transaction data; coupling means on said housing for transferring transaction data between modules; first means for debiting said first memory means with transaction data stored in said second memory means; second means for crediting said first memory means with transaction data supplied to said module through said coupling means and means for enabling a funds data transfer between modules.

3. A system for transferring funds data in lieu of cash transactions, comprising a plurality of identical funds data transfer modules, each of said modules comprising a housing; keyboard means on said housing for manually entering transaction data; first memory means for storing an account balance; second memory means for storing keyboard entered transaction data; means for coupling transaction data between pairs of said modules; first means responsive to said second memory means for debiting the account balance stored in said first memory means; second means responsive to said coupling means for crediting the balance stored in said first memory means and means for enabling a funds data transfer between modules.

4. A system for transferring funds in lieu of cash transactions, comprising a plurality of funds transfer modules, each of said modules including a housing; first memory means for storing an account balance; first means for transferring data stored in said first memory means to an external coupling means on said housing; means for interconnecting the external coupling means on said module to the external coupling means on a second one of said modules; second memory means; keyboard means on said housing for manually entering transaction data; means for storing transaction data entered at said keyboard means in said second memory means; means for supplying data stored in said second memory means to said external coupling means; means for crediting the contents of said first memory means with incoming data at said coupling means; means for debiting the contents of said first memory with the data stored in said second memory means and means for enabling a funds data transfer between modules.

5. A system for performing funds data transfer in lieu of cash transactions, comprising first and second identical transaction modules, each of said modules including a housing, first memory means for storing an account balance, keyboard means on said housing for manually entering transaction data, second memory means for storing keyboard entered transaction data and coupling means for interfacing said stored transaction data between said modules;

- means for supplying data stored in said second memory means to said first memory means to debit the stored account balance;
- means for further supplying said data stored in said second memory means via said coupling means to said second module to credit the account balance stored in the first memory means of said second module; and
- means for enabling transfer of funds data from said second memory means of said first module to said first memory means of said first and second modules.

6. A system for performing funds data transfer in lieu of cash transactions, comprising first and second identical transaction modules, each of said modules including a housing, first memory means for storing an account balance, keyboard means on said housing for manually entering transaction data, second memory means for storing keyboard entered transaction data;

- coupling means for interfacing stored transaction data between said first and second modules;
- first means for debiting the account balance stored in said first memory means by the transaction data stored in said second memory means;
- second means for crediting said stored account balance by transaction data stored in the second memory means of said second module and incoming on said coupling means to said first module; and
- means for enabling transfer of funds data from said second memory means to complete a funds transfer transaction.

7. The invention as defined in any of claims 1–6 including first display means on said housing for displaying the account balance stored in said first memory means.

8. The invention as defined in any of claims 1–6, including second display means for displaying transaction data stored in said second memory means.

9. The invention as defined in any of claims 1–6, wherein said coupling means includes plug means and complementary plug means on said housing, said plug means on said housing adapted to mate with the complementary plug means on the housing of another transaction module.

10. The invention as defined in any of claims 1–6, wherein said coupling means includes connector means on said housing and cable means for interconnecting the connector means of a pair of said modules.

11. The invention as defined in any of claims 1–6 including third display means for displaying an indication of a completed transaction.

12. The invention as defined in any of claims 1–6, including means for comparing the balance stored in said first memory means with the transaction amount stored in said second memory means and fourth display means responsive to said comparing means for displaying an account overdraw.

13. The invention as defined in any of claims 1–6, including means for periodically debiting the balance stored in said first memory means.

14. The invention as defined in any of claims 1–6, including means in the absence of funds transfer transactions for periodically debiting the balance stored in said first memory means.

15. The invention as defined in any of claims 1–6, wherein said funds transfer enabling means includes means for transferring secret number data between modules and means for displaying secret number data associated with one module in another module.

16. The invention as defined in any of claims 1–6, wherein said funds transfer enabling means includes means for generating secret number data, means for comparing said secret number data with keyboard entered data and means responsive to said comparing means for generating a funds transfer enable signal.

17. The invention as defined in any of claims 1–6, including external means for preloading said first memory means with an initial account balance and for supplementing an existing balance stored in said first memory means.

* * * * *